United States Patent [19]

Ito

[11] Patent Number: 4,750,885
[45] Date of Patent: Jun. 14, 1988

[54] BALL JOINT

[75] Inventor: Eiichi Ito, Meerbusch, Fed. Rep. of Germany

[73] Assignee: TRW Ehrenreich GmbH & Co. KG, Dusseldorf, Fed. Rep. of Germany

[21] Appl. No.: 54,576

[22] Filed: May 27, 1987

[30] Foreign Application Priority Data

Jun. 5, 1986 [DE] Fed. Rep. of Germany ....... 3619003

[51] Int. Cl.4 .......................... F16B 3/00; F16D 1/12
[52] U.S. Cl. .................................... 403/135; 403/133; 403/140
[58] Field of Search ............... 403/138, 140, 132, 133, 403/135

[56] References Cited

U.S. PATENT DOCUMENTS 3,787,127  1/1974  Cutler ............................ 403/140 X
3,967,907  7/1976  Schmidt .
4,297,047  10/1981 Farrant .
4,372,621  2/1983  Farrant .
4,564,307  1/1986  Ito ..................................... 403/140

FOREIGN PATENT DOCUMENTS 0144775  7/1984  European Pat. Off. .
1953116  5/1971  Fed. Rep. of Germany .
2405160  8/1975  Fed. Rep. of Germany .
1094384  5/1955  France .
2052619  1/1981  United Kindgom .

OTHER PUBLICATIONS

Werkstoffe und Werkstoffprufung (Industrial Material and Material Testing), vol. 2, pp. 392, 393., K. Wellinger and E. Krageloh.

Primary Examiner—Andrew V. Kundrat
Attorney, Agent, or Firm—Tarolli, Sundheim & Covell

[57] ABSTRACT

A ball joint for transmission rods in motor vehicles comprising a bearing member made of a plastic material and arranged between a ball head (2) and a joint housing (1). The bearing member exerts a radial pressure on the ball head and comprises an outer shell (4) having a spherical inner surface (16) and an inner shell (5) having a spherical inner surface (17). To preload the ball head (2), as independently as possible of dimension variations and to elastically damp shock loads, the outer shell (4) is made of a hard resilient plastic material, the inner shell has stop surfaces (21) on an end surface (18) thereof, is supported by resiliently deformable elevations (19) against the outer shell, and groove-like openings (20) are formed between the resiliently deformable elevations (19) and the stop surfaces (21), into which openings the elevations (19) are elastically deformed. The stop surfaces (21) contact the outer shell (4) when the elevations (19) are completely deformed into the openings (20).

5 Claims, 3 Drawing Sheets

BALL JOINT

The invention relates to a ball joint for transmission rods in motor vehicles. The ball joint comprises a bearing member made of plastic material and arranged between a ball head and a joint housing. The bearing member exerts a radial pressure on the ball head and comprises an outer shell with a spherical inner surface and an inner shell also with a spherical inner surface. The inner surfaces form a sliding surface for the ball head. The outer shell has a recess for receiving the inner shell. The inner shell is made of a soft resilient plastic material and has such dimensions that it projects into a spherical recess defined by the inner surface of the outer shell when the ball head is not in the housing. The inner shell is elastically deformed when the ball head is received in the housing.

U.S. Pat. No. 4,297,047 discloses a ball joint with a two-part bearing member, which consists of a cup-form outer shell received in the joint housing and supporting the ball head against the housing surfaces defining an opening through which the shank extends, and an inner shell received within the outer shell and supporting the ball head in a pole zone. The inner shell is made of a soft resilient plastic material and is supported on bottom elevations of the outer shell, also made of a soft resilient plastic material. When the rim of the housing opening is rolled in, these elevations are elastically deformed, whereby the force stored in them loads the ball head.

In this known construction, however, the deforming of the elevations is determined, to a considerable extent, by the dimension tolerances of the inner bore of the housing and of the outer shell, so that variations in tolerances of the preload of the ball head are also relatively large. Moreover, this previously known outer shell, upon rotation of the ball head, can rotate with it, and a wedge effect results, particularly when the soft inner shell is deformed at the inner rim thereof under high load, especially under thermal load in the hollow space thereof, in clamping of the inner shell between the ball head and the outer shell.

German Published Application No. 2,434,490 discloses a ball joint with a two-part bearing member consisting of an inner shell with a spherical inner surface and an outer shell. The inner shell is made of a hard resilient plastic material and is received within an outer shell of resilient material and having on its outer surface ridges for support in the joint housing. The outer shell is deformed when it is preloaded with the ball head especially in the zone between the ridges. This results in the forming of lubricant pockets on the inner shell and, thus, in improvement of distribution of a lubricant on the bearing surfaces of the ball head.

The performance of this ball joint also depends, to a high degree, on the preload of the ball head. In this previously known ball joint, this preload is subject to very large production-caused variations. Variations in dimension of the joint housing cavity considerably influence the preload of the outer shell which acts, either directly or through the thin inner shell on the ball head.

Accordingly, the object of the invention is providing a technically improved ball joint, in which dimension variations of the joint housing cavity and the outer shell have practically negligible influence on the preload of the ball head, and which elastically absorbs dynamic and shock-forming loads during operation.

The object of the invention is achieved by the following combination of features:

(a) The outer shell is made of a hard resilient plastic material;

(b) The inner shell has, on one end surface thereof, stop surfaces and is supported against the outer shell by elastically deformable elevations extending between the stop surfaces;

(c) Between the elastically deformable elevations and the stop surfaces, groove-like openings are formed, into which the elevations are elastically deformed, and the stop surfaces, when the elevations are completely deformed into the openings, contact the outer shell.

In a ball joint designed according to these technical teachings preloading of the bearing member through the joint housing to obtain the desired preload of the ball head is no longer needed. The preload of the ball head is effected, in particular, by the soft resilient inner shell which, when the ball head is received in the housing, is elastically compressed, particularly against the elevations, by a definite amount. The groove-like openings protect the elevations against a plastic deformation, which must be taken care of, especially in the case of shock-forming loads on the ball joint. Namely, the elevations can be completely deformed into the groove-like openings whereby they are not subject to any plastic deformation any more. In this deformation phase, however, the stop surfaces contact the outer shell and support the inner shell against the outer shell, so that the force on the elevations no longer increases. Dimension variations of the joint housing or the bearing member because of the relatively rigid and thick-walled outer shell, can cause only slight dimension variations in the zone of the cavity of the outer shell. The influence of such dimension variations on the preload of the ball head in the zone of the spherical inner surface of the outer shell is therefore negligible. Dimension variations of the inner shell and the outer shell are also unimportant, since they can be manufactured with great accuracy by injection molding.

In one practical embodiment, the inner shell may be centered on its outer surface in the recess of the outer shell. In this way, the preassembly of the inner shell is facilitated, and reproduction of its seating in the recess of the outer shell is assured.

In another embodiment, the outer shell is designed as one part having at its cover side end a circumferential flange for connection to the joint housing, and having a free end at its ball stud side. The outer shell may be clamped solidly at the circumferential flange, without fear of its deformation in the zone of receiving the inner shell or the spherical inner surface. Because of the one-part design of the outer shell and the free end at the ball stud side, the housing depth has no influence on the clamping of the outer shell. A one-part outer shell may be slotted lengthwise several times at its ball stud side opening to facilitate installation of the ball head.

When, in one practical embodiment, the soft inner shell is received in a cylindrical recess of the hard outer shell, the inner shell, even under high loads and, especially thermal loads, cannot wedge between the ball head and the outer shell, because the ball head is already sufficiently enclosed and protected by the hard outer shell.

Other details and advantages of the subject invention will become clear from the description which follows and respective drawings, in which a preferred embodiment of the ball joint according to the invention is schematically represented.

Figure 1:
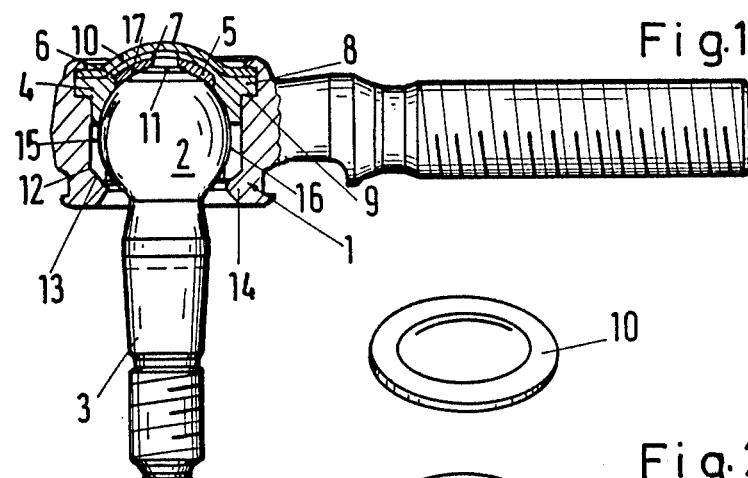
FIG. 1 shows a longitudinal cross section of a ball joint, in an assembled condition.

A ball head 2 with a ball stud 3 is located in a joint housing 1 with a two-part bearing member consisting of an outer shell 4 and an inner shell 5 interposed therebetween. The inner shell 5 has a cylindrical outer surface 6 and is received in a recess 7 of the outer shell 4. The outer shell 4 has a circumferential flange 8 which lies against a shoulder 9 of the joint housing 1. At its upper end, the ball joint is closed by a rolled-in cap 10 under which a grease reservoir 11 lies.

At its shank end 12, the outer shell 4 hangs freely, and a clearance 13 between the end 12 and a housing portion 14 is greater than dimension variations of the depth of the joint housing 1. At its ball shank end, the outer shell 4 is provided with several slots 15, distributed evenly over its circumference.

The outer shell 4 has an inner surface 16, and the inner shell 5 has an inner surface 17 which both lie against the ball head 2.

The outer shell 4 is made of a hard resilient plastic material, for example, polyoxymethylene (POM). The inner shell 5 is made of a soft resilient plastic material, for example, polyurethane (PUR).

Figure 5:
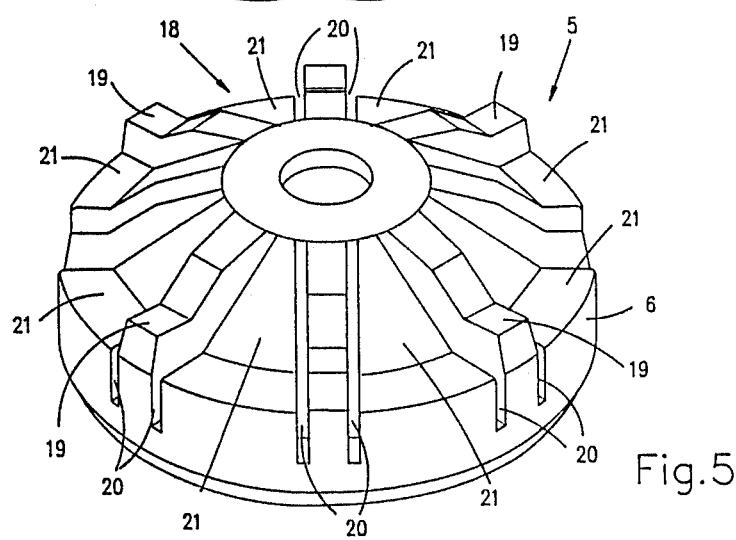
FIG. 5 shows a perspective view of the inner shell.

As it can be clearly seen in FIG. 5, the inner shell 5 has, at its end surface 18, bar-shaped elevations 19 extending radially. Lower or deeper located stop surfaces 21 are arranged between the elevations 19 and are separated from the elevations 19 by radially extending openings 20.

Figure 2:
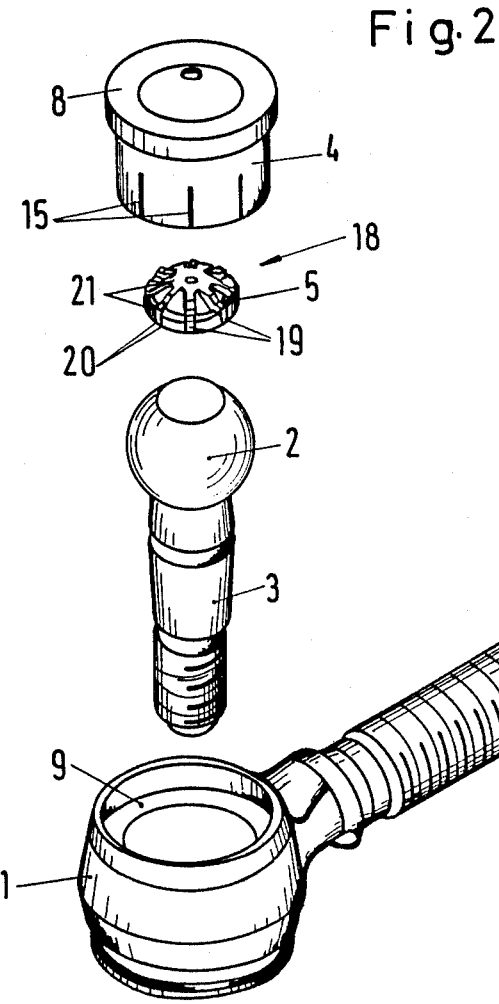
FIG. 2 shows an exploded view of the same ball joint.
Figure 3:
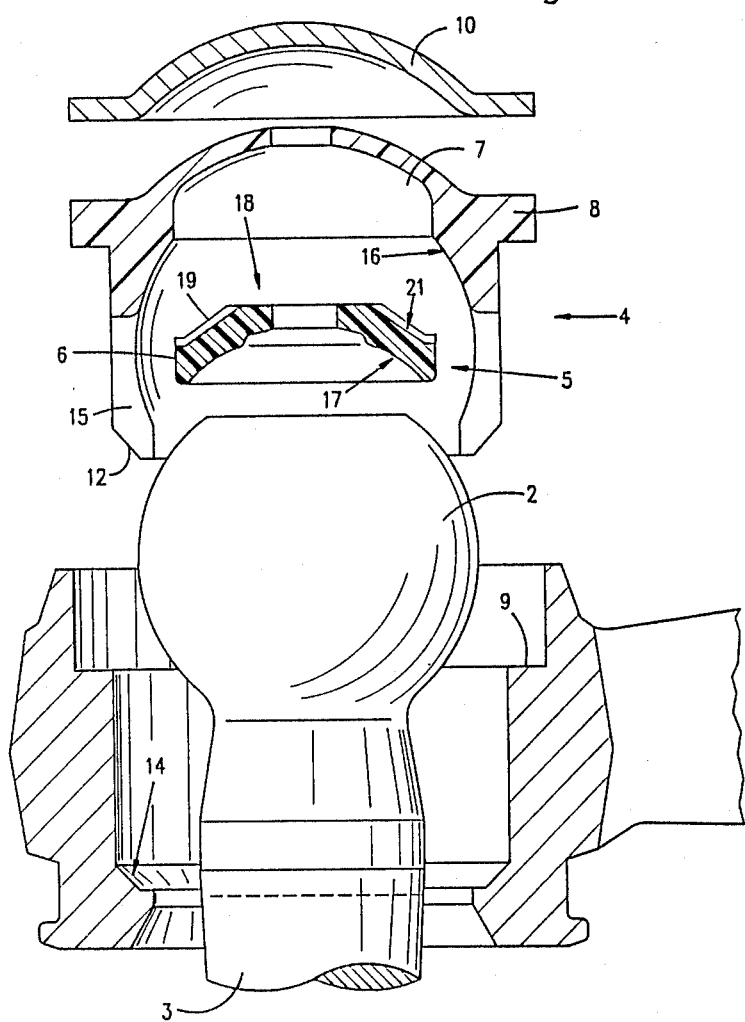
FIG. 3 shows an exploded longitudinal cross-section of the ball joint shown in FIG. 1 but on a larger scale.
Figure 4:
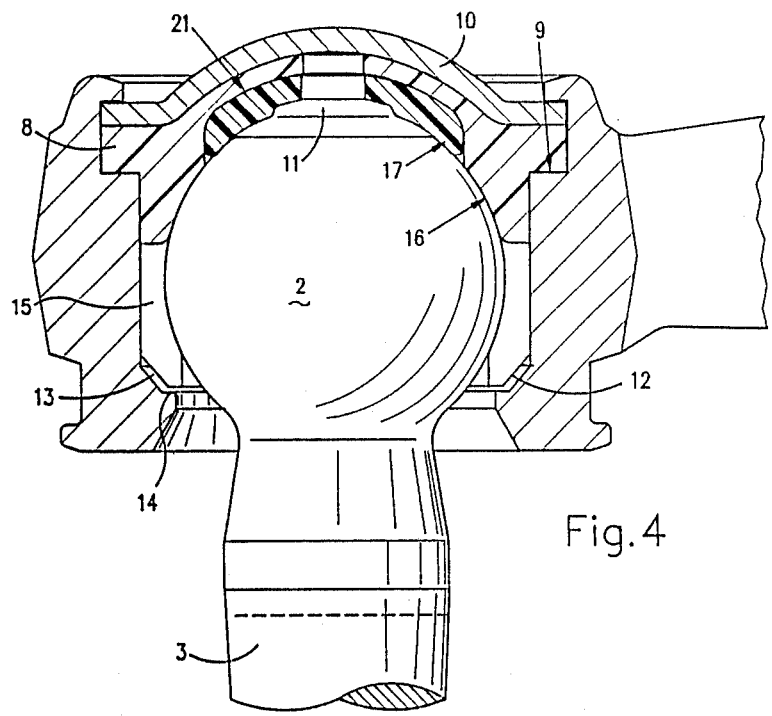
FIG. 4 shows a longitudinal cross-section of the ball joint shown in FIG. 3 in an assembled condition.

Upon assembling of the ball joint, as shown in the exploded view of FIG. 2, the ball head is first received in the assembled bearing member consisting of outer shell 4 and inner shell 5. The insertion of the ball head 2 is facilitated by the slots 15. Now the ball head, bearing member and a cap 10 are mounted in the joint housing 1 and fastened by tensioning the flange 8.

When fastening the outer shell 4, the opening 7 is hardly deformed at all, so that dimension variations of the housing cavity and/or of the bearing member have practically no influence on the preload of the inner shell. Dimension variations of housing depth have no influence, anyway, because the ends of the bearing member are not clamped together. In combination with the hard resiliency of the outer shell 4, a very good dimensional stability of the inner surface 16 and the opening 7 is achieved.

When assembling the ball joint, the inner shell 5 is resiliently compressed to a reproducible extent to exert a force on the ball head 2. The preload of the ball head 2 is largely determined by this force and, therefore, varies only slightly. The reproduction of the preload of the ball head is also favored by the centering of the inner shell 5 on its cylindrical surface 6.

The resiliency of the inner shell 5 may be influenced both by the choice of material and by production steps. The disclosed embodiment is especially suitable for damping of strong axial shocks. When assembling, the long elevations 19 are at first partially resiliently compressed and are slightly deformed, at their sides, into the groove-like openings 20. Comparatively small shocks lead to a further elastic deformation of the elevations 19. In the case of large shocks, the elevations 19 are completely deformed into the groove-like openings 20, and the lower or deeper located stop surfaces 21 contact the inner surface of the outer shell and protect the elevations 19 against further plastic deformation.

I claim:

1. A ball joint for transmission rods in motor vehicles comprising a bearing member made of a plastic material and arranged between a ball head (2) and a joint housing (1), the bearing member exerting a radial pressure on the ball head and comprising an outer shell (4) having a spherical inner surface (16) and an inner shell (5) having a spherical inner surface (17), the inner surfaces (16, 17) forming a sliding surface for the ball head (2), the outer shell having a recess for receiving the inner shell, the inner shell (5) being made of a soft resilient plastic material and having such dimensions that it projects into a spherical recess defined by the inner surface (16) of the outer shell (4) when the ball head is not received in the housing and is resiliently deformed when the ball head is received in the housing, characterized in that the outer shell (4) is made of a hard resilient plastic material; the inner shell (5) has on its end surface (18) stop surfaces (21) and is supported by resiliently deformable elevations (19) against the outer shell (4); and groove-like openings (20) are formed between the resiliently deformable elevations (19) and the stop surfaces (21) in which openings the elevations (19) are resiliently deformed, the stop surfaces (21) lying against the outer shell (4) when the elevations (19) are completely deformed into the openings (20).

2. A ball joint according to claim 1, characterized in that the inner shell (5) is centered, at its outer surface (6) in the recess (7) of the outer shell (4).

3. A ball joint according to one of claims 1 or 2, characterized in that the outer shell (4) is designed in one part, that its cover side end is provided with a circumferential flange (8) for connection to the joint housing (1) and that its ball stud end (12) projects freely.

4. A ball joint according to claim 3, characterized in that the outer shell (4) has, at its ball shank end opening, a plurality of slots (15) extending lengthwise.

5. A ball joint according to claim 1, characterized in that the inner shell (5) is received in a cylindrical recess of the outer shell (4).

* * * * *